July 28, 1931.　　　H. M. ELSEY　　　1,816,424
GLASS SEAL

Filed March 20, 1930

INVENTOR
Howard M. Elsey.
BY
ATTORNEY

Patented July 28, 1931

1,816,424

UNITED STATES PATENT OFFICE

HOWARD M. ELSEY, OF OAKMONT, PENNSYLVANIA, ASSIGNOR TO WESTINGHOUSE ELECTRIC & MANUFACTURING COMPANY, A CORPORATION OF PENNSYLVANIA

GLASS SEAL

Application filed March 20, 1930. Serial No. 437,374.

This invention relates to glass seals and especially to methods of sealing molybdenum inleading conductors into gas-tight tubes.

An object of the invention is to make a gas-tight seal for a molybdenum conductor.

Tungsten has hitherto been used as an inleading conductor in vacuum tubes of certain kinds, notably those composed of boro-silicate glass. Tungsten, however, has a disadvantage in being relatively brittle, and large wires of this substance will not stand cold bending. Molybdenum, on the other hand, will stand cold bending and has properties which are at least as desirable as those of tungsten for hard-glass seals. Molybdenum has, however, one disadvantage that has hitherto limited its use in certain instances. This disadvantage is that it oxidizes rather easily in a glass-blower's flame and the oxide so produced will prevent the attainment of a tight seal if it gets between the molybdenum wire and the glass because it destroys the wetting power of the one for the other. Furthermore, molybdenum oxide is apt to be volatile at the working temperature of the glass and to cloud its surface. An object of the invention is to overcome this difficulty so that the molybdenum electrode can be tightly sealed in the tube, and the tube assembled to have a clear transparent surface.

Figure 1:
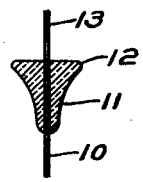
Figure 2:
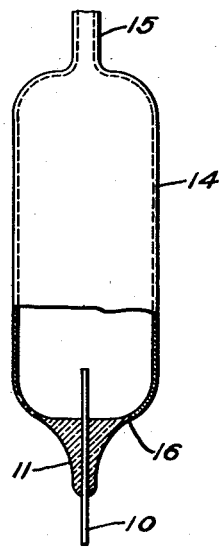

Other objects of the invention will become evident from the following detailed description, taken in conjunction with the accompanying drawings in which:

Figure 1 is a view of the glass bead formed on a molybdenum wire as one of the primary steps in forming the molybdenum-glass seal, and Fig. 2 is a partially side elevational and partially sectional view illustrating the preferred method of sealing the beaded molybdenum electrode in the press of a tube.

The molybdenum wire 10, to be used as an electrode, as disclosed in Fig. 1, has a glass bead 11 first formed on its shank at a point where the electrode will pass through the glass of the tube. The upper part of the bead may be expanded outwardly, as at 12. The end 13 of the wire, which is to extend inside of the glass apparatus, is then cleaned, by any suitable means, until it is free from the oxide layer. This may be done either mechanically or by making it the cathode, at high current density in an alkaline bath.

The surface of the molybdenum is then preferably plated, as by electro-plating, very lightly with copper which adheres very well to the molybdenum. Nickel is then preferably plated upon the copper to form with it, a double coating which prevents the molybdenum from oxidizing when the electrode is sealed into the tube. If mercury is to be used in the tube, the copper coating is not used. If desired, the molybdenum may be further protected by a plating of chromium on the nickel.

The tube 14, into which the electrode is to be sealed, may be exhausted of air by any suitable nonoxidizing or chemically inert gas, such as nitrogen, entering the tube through the opening 15, and the beaded electrode may then be slipped into the opening in the seal 16 of the glass tube, previously provided for the bead, and through which the nitrogen or other gas is escaping from the apparatus.

The opening 16 for the beaded electrode should be of such size that the broad head 12 of the bead will fit tightly within it. The stream of nitrogen or other gas may then be cut off, and the bead, with its electrode, sealed in the glass. The density of nitrogen is almost that of air, so that the two gases have about the same rate of effusion. Accordingly, the nitrogen will not escape rapidly from the open end of the tube, and, in large tubes, the glass-blower can blow into the tube in working the seal without adding any oxidizing amount of oxygen to the nitrogen. The glass blower will also be able to finish the seal without the glass being fogged by sublimed molybdic oxide.

In tubes that require very careful manufacture in regard to sealing and clear transparent appearance, the use of the various steps outlined above is recommended. This is especially true where the tube is small, and the electrode and the inside of the glass cannot be reached for cleaning after the electrode is sealed. However, with a large proportion of tubes, either the plating of the molybdenum electrode with a protective coating before sealing or the working of the seal in an inert gas will be sufficient to prevent the oxidation of the molybdenum. In other words, with certain tubes, the molybdenum may be coated with a protected coating and then sealed by the glass-blower in the tube without further precaution against oxidizing the molybdenum. On the other hand, the molybdenum electrode may be bare above its bead and very carefully sealed into certain tubes in the presence of an inert non-oxidizing gas.

Accordingly, there has been disclosed a method of sealing an electrode of molybdenum in a gas-tight tube by which the electrode is very tightly sealed, and also in which the interior surface of the tube is not fogged by the molybdic oxide.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. The method of sealing a molybdenum electrode in a tube which comprises forming a bead on the shank of said electrode, cleaning the surface of said electrode, plating the surface of said electrode with a protective coating and sealing said beaded electrode into said tube.

2. The method of sealing a molybdenum electrode in a tube which comprises forming a bead on the shank of said electrode, inserting an inert gas into said tube and sealing said beaded electrode in said tube.

3. The method of sealing a molybdenum electrode in a tube which comprises forming a bead on the shank of said electrode, plating the surface of said electrode, inserting an inert gas into said tube and sealing said beaded electrode in said tube.

In testimony whereof, I have hereunto subscribed my name this 15th day of March, 1930.

HOWARD M. ELSEY.